(12) United States Patent
Whitney et al.

(10) Patent No.: US 9,359,878 B2
(45) Date of Patent: Jun. 7, 2016

(54) SPLIT FLOW PIPE SEPARATOR

(71) Applicants: Scott M. Whitney, Missouri City, TX (US); Per Reidar Larnholm, Moss (NO)

(72) Inventors: Scott M. Whitney, Missouri City, TX (US); Per Reidar Larnholm, Moss (NO)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 14/610,765

(22) Filed: Jan. 30, 2015

(65) Prior Publication Data
US 2015/0260026 A1    Sep. 17, 2015

Related U.S. Application Data

(60) Provisional application No. 61/951,891, filed on Mar. 12, 2014.

(51) Int. Cl.
  *E21B 43/38* (2006.01)
  *E21B 43/36* (2006.01)
  *B01D 17/02* (2006.01)
  (Continued)

(52) U.S. Cl.
  CPC ............ *E21B 43/36* (2013.01); *B01D 17/02* (2013.01); *B01D 17/0217* (2013.01); *B01D 21/2472* (2013.01); *E21B 43/12* (2013.01); *B01D 2221/04* (2013.01)

(58) Field of Classification Search
  CPC ......... E21B 43/34; E21B 43/36; B01D 17/02; B01D 17/0217; B01D 21/2472
  USPC ................................................. 166/357, 267
  See application file for complete search history.

(56) References Cited

U.S. PATENT DOCUMENTS

| 1,516,132 A | 11/1924 | Allen et al. |
| 3,768,726 A | 10/1973 | Hale et al. ............... 233/16 |

(Continued)

FOREIGN PATENT DOCUMENTS

| RU | 2451251 | 5/2012 | ............ F25J 3/00 |
| WO | WO2007/009316 | 8/2007 | ............ B04C 3/06 |
| WO | 2014/018148 | * 1/2014 | |

OTHER PUBLICATIONS

Chuang, K. T. et al. (2000) "Tray Columns: Design," *Academic Press*, pp. 1135-1140 (retrieved from the internet on Dec. 4, 2014: http://razifar.com/cariboost_files/Tray_20Columns_20Design.pdf.

(Continued)

*Primary Examiner* — Matthew R Buck
(74) *Attorney, Agent, or Firm* — ExxonMobil Upstream Research Company Law Department (57) ABSTRACT

The current disclosure relates to multiphase fluid separation via a multiphase separation system. The multiphase separation system is configured to feed a multiphase fluid into an inlet line within the separation system. The multiphase fluid is configured to flow through a divide and be split into separate lines of similar diameter. A control volume is also connected at the end of the separate lines, and the control volume has a diameter greater than the separate lines of similar diameter. The control volume includes outlet lines, and is configured to adjust fluid flow rate at an outlet line. Also included in the current disclosure is a sand boot connected to the separate lines that is oriented vertically with respect to the separate lines, and is configured to collect and remove sand accumulated in the multiphase separation system.

17 Claims, 6 Drawing Sheets

(51) Int. Cl.
*E21B 43/12* (2006.01)
*B01D 21/24* (2006.01)

(56) References Cited

U.S. PATENT DOCUMENTS

| | | | | |
|---|---|---|---|---|
| 4,187,088 | A | 2/1980 | Hodgson | 55/169 |
| 4,661,127 | A | 4/1987 | Huntley | 55/174 |
| 5,149,344 | A * | 9/1992 | Macy | 96/159 |
| 6,197,095 | B1 | 3/2001 | Ditria et al. | 95/248 |
| 7,051,540 | B2 | 5/2006 | TeGrotenhuis et al. | 62/93 |
| 7,140,441 | B2 * | 11/2006 | Hauge et al. | 166/357 |
| 7,278,543 | B2 * | 10/2007 | Sagatun et al. | 96/184 |
| 7,363,982 | B2 | 4/2008 | Hopper | 166/357 |
| 7,490,671 | B2 | 2/2009 | Gramme et al. | 166/357 |
| 7,516,794 | B2 | 4/2009 | Gramme et al. | 166/357 |
| 7,540,902 | B2 * | 6/2009 | Esparza et al. | 95/243 |
| 7,611,635 | B2 * | 11/2009 | Chieng et al. | 210/744 |
| 8,075,770 | B2 * | 12/2011 | Thorsen et al. | 210/221.2 |
| 8,220,551 | B2 * | 7/2012 | Fenton | 166/357 |
| 8,273,151 | B2 * | 9/2012 | Miotto et al. | 95/24 |
| 8,282,711 | B2 * | 10/2012 | Grenstad et al. | 95/253 |
| 8,454,843 | B2 * | 6/2013 | Brown et al. | 210/803 |
| 8,657,897 | B2 | 2/2014 | Kayat et al. | 55/337 |
| 8,657,940 | B2 * | 2/2014 | Aarebrot et al. | 96/188 |
| 8,778,159 | B2 | 7/2014 | Liverud et al. | 204/563 |
| 2005/0006086 | A1 * | 1/2005 | Gramme | 166/105.5 |
| 2010/0032164 | A1 | 2/2010 | Bakke | 166/366 |
| 2010/0326922 | A1 | 12/2010 | Varanasi et al. | 210/708 |
| 2012/0160103 | A1 | 6/2012 | Suppiah et al. | 95/249 |
| 2013/0092633 | A1 * | 4/2013 | Abrand et al. | 210/747.6 |

OTHER PUBLICATIONS

Hannisdal, A. et al. (2012) "Compact Separation Technologies and Their Applicability for Subsea Field Development in Deep Water," *Offshore Technology Conference*, OTC23223, Houston, Texas Apr. 30-May 3, 2012, pp. 1-12.

* cited by examiner

SPLIT FLOW PIPE SEPARATOR

CROSS REFERENCE TO RELATED APPLICATIONS

This application claims the priority benefit of U.S. patent application No. 61/951,891 filed Mar. 12, 2014 entitled SPLIT FLOW PIPE SEPARATOR, the entirety of which is incorporated by reference herein.

FIELD

The present techniques provide for the in-pipe separation of multiphase fluid production streams into its components. The techniques described herein provide for the separation of production fluids into component oil and water phases using a subsea multiphase separation system.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Any of a number of subsea separation techniques may be used to enhance the amount of oil and gas recovered from subsea wells. However, subsea separation at water depths greater than 1500 meters becomes especially challenging due to the environmental conditions. As water depth increases, the external pressure on a vessel created by the hydrostatic head increases the required wall thickness for vessels used for subsea processing. At water depths greater than 1500 meters, this wall thickness has increased to such an extent that typical gravity separation is not practical. In addition, vessels with such a large wall thickness can be a challenge to fabricate, and the added material and weight can impact project economics, as well as the availability of the vessel for maintenance. As a result, large diameter separators often cannot be used at such depths.

Further information may be found in U.S. Pat. No. 8,282,711 B2 (the '711 patent). This patent relates to subsea installation and a method for separation of liquid and gas. This disclosure is directed toward separation of liquids and gases from a subsea production fluid, using a pipe system that splits the flows of the liquid and gaseous fluids.

However, the '711 patent does not disclose separating individual oil and water streams from a mixed phase oil/water flow of fluid. Furthermore, this reference does not provide a method for sand separation or the prevention of sand deposition in the pipe separator. The reference also does not provide for polishing of the gas or the water streams such that either could be re-injected.

Additional information may also be found in U.S. Pat. No. 7,490,671 B2. This patent relates to a pipe separator with improved separation of oil gas and water. This system utilizes cyclonic separation for gas-liquid separation followed by oil-water separation in a pipe separator that must be aided by electrostatic coalescence.

Further information may also be found in U.S. Pat. No. 7,516,794 B2. This system is similar to that in U.S. Pat. No. 7,490,671 B2, however, with a new requirement of being "piggable".

Additional information may also be found in U.S. Application 2008/0116072 A1. This system utilizes an electrostatic coalescer to treat an oil or emulsion stream which is extracted from an oil-water separator and returned to the same separator. It provides multiple arrangements of separators in which the technology described herein can be applied.

None of the references cited above include a control volume or a polishing section that is used to regulate the outlet of each line, thereby flowing a substantially oil stream, a substantially water stream and an oil/water emulsion.

SUMMARY

An exemplary embodiment provides a split flow separation system, including an inlet line, where a multiphase fluid is configured to flow through. The system includes a divide after the inlet, and the divide splits the inlet line into two or more separate lines of similar diameter that are substantially parallel to one another, and are configured to separate components of a multiphase fluid. The system also includes a control volume connected to the two or more separate lines of similar diameter. The control volume has a diameter greater than the separate lines of similar diameter, and the control volume includes one or more outlet lines. The outlet lines are configured to flow substantially oil from an upper outlet line and substantially water from a lower outlet line. The separation system also includes a sand boot connected to the separate lines of similar diameter. The sand boot is disposed below the separate lines of similar diameter, and the sand boot is configured to collect and remove sand accumulated in the split flow separation system.

Another exemplary embodiment provides a method for separation of oil, gas, water, and solid particles within a multiphase fluid, including flowing a multiphase fluid into a distribution inlet of a multiphase pipe separator. The method also includes splitting the distribution inlet at a horizontally oriented divide, and flowing the multiphase fluid into separate pipe separator lines downstream of and in a plane parallel to the divide. The method includes separating the multiphase fluid into an oil phase and a water phase in the pipe separator lines, and separating the solid particles using a downcomer and a boot, wherein the boot opens when solid particles are accumulated. The method also includes flowing each line into a control volume, wherein the flow rate from each line is controlled. The method is configured for flowing substantially water through an outlet at a lower end of the control volume, and flowing substantially oil through an outlet at an upper end of the control volume.

Another exemplary embodiment discloses a multiphase separation system that includes an inlet line configured to feed a multiphase fluid through a divide within the split flow separation system, wherein the divide splits the multiphase fluid into multiple pipe separator lines that are substantially parallel with respect to one another. The system includes a polishing section within the multiple pipe separator lines. The system also includes a control volume connected to each pipe separator line with a larger diameter than the pipe separator line, wherein the control volume comprises multiple outlets. The system includes a control valve, and a control system used to control the flow within and out of the split flow pipe separation system.

DESCRIPTION OF THE DRAWINGS

The advantages of the present techniques are better understood by referring to the following detailed description and the attached drawings, in which.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

As discussed above, traditional large diameter separators face technical challenges in deep water, for example, at depths greater than approximately 1500 meters. Thus, embodiments described herein provide an unconventional separation system that is capable of achieving acceptable oil-water separation and damping potential flow fluctuations, while meeting the size and weight restrictions imposed on deep water processing units. Further, the separation system can be designed to pipe code instead of vessel code, which may provide cost and weight savings. In many cases, for a given pressure class, the required wall thickness for a pipe is less than the required wall thickness for a corresponding vessel.

According to embodiments described herein, a compact, subsea multiphase separation system is used to enhance subsea well production, especially in deepwater and Arctic environments. In various embodiments, the separation system is a separator that can be configured to separate production fluids into an oil phase, an aqueous phase, and a solid phase. In some embodiments, an upstream liquid-gas separator can be used to substantially remove gases from the production fluid. In other words, examples of the current separation techniques may be used to create single phase streams. This may allow for the usage of single phase pumps, which are more efficient and can achieve larger pressure differentials compared to multiphase pumps. In order to pump a single phase stream, one single phase pump may be sufficient. In contrast, in order to pump a multiphase stream, a series of multiphase pumps may be used to achieve the same pressure differential, especially for high boosting applications.

The separation process described may be used to achieve separation, at least in part, of aqueous fluids and solid sand particles from production fluids, e.g., oil. The removal of aqueous fluids is termed water removal herein, although this may be understood to include water with other contaminants, such as salts or other miscible fluids. Such water removal may mitigate flow assurance concerns, allowing more concentrated oil streams to be sent to the surface. These separated streams will form lower amounts of hydrates, such as methane clathrates, thus lowering the risk of plugging or flow restrictions. Further, corrosion concerns can be reduced or eliminated. The sand and water by-product streams can be disposed topsides to dedicated disposal zones, reservoirs, the seabed, or the like.

Water removal may also result in a decrease in the hydrostatic head acting on the reservoir, thus increasing both the reservoir drive and production. The separation process may also reduce flow line infrastructure, reduce the number of topside water treating facilities, reduce power and pumping requirements, and de-bottleneck existing facilities that are challenged with declining production rates due to increased water cuts.

Figure 1:
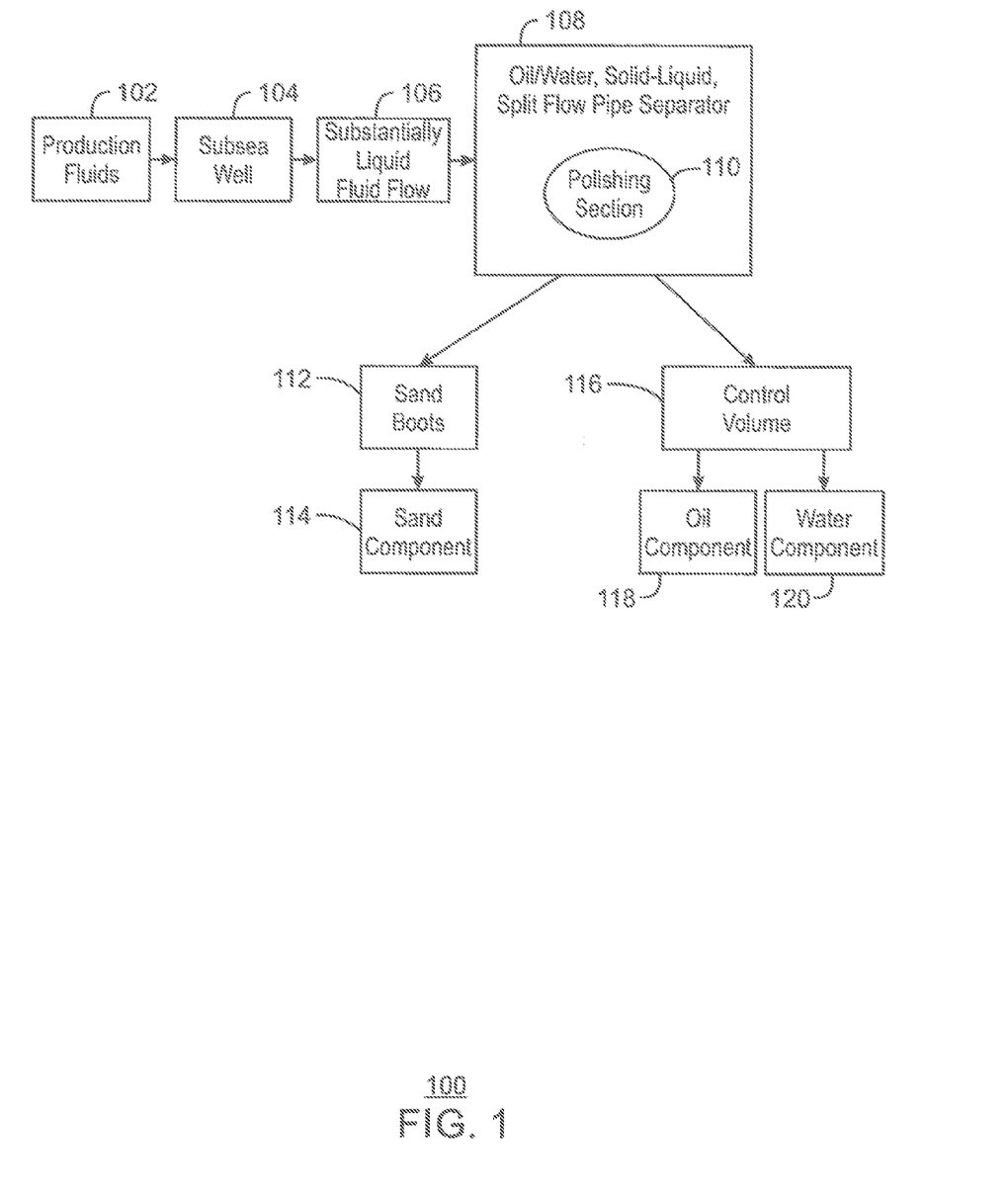
FIG. 1 is a block diagram showing a multiphase separation system for separating production fluids into component streams.

FIG. 1 is a block diagram showing a multiphase separation system 100 for separating production fluids 102 into component streams. The production fluids 102 may be obtained from a subsea well 104. The production fluids 102 may be hydrocarbon fluids that include a mixture of natural gas, oil, brine, and solid impurities, such as sand. The production fluids 102 may be obtained from the subsea well 104 via any type of subsea production system (not shown) that is configured to produce hydrocarbons from subsea locations. A gas-liquid separation system (not shown) can optionally be used upstream of the disclosed technology to separate a gas stream and a liquid stream. The gas stream can be further processed by downstream equipment. The downstream equipment (not shown) may include, for example, any type of downstream gas processing equipment, such as a gas compressor, gas treatment facility, gas polishing device, or the like, or a gas pipeline.

At block 106, a substantially liquid stream 106 is flowed into a split-flow pipe separator 108. The split-flow pipe separator 108 is configured to separate the oil and water and solid sand particles from the production fluids 102. The split-flow pipe separator 108 divides the process stream of production fluids 102 into two or more streams for separation in different pipe separator lines. Separation between the oil component and denser water component is achieved, at least in part, within a polishing section 110 in each separator line, and, through use of sand boots 112, the sand component 114 is substantially removed upstream of a control volume 116.

Within the multiphase separation system 100, the production fluids 102 can be separated, at least in part, into split streams, which can be commingled in a control volume 116 at the end of each pipe separator line. The control volume 116 is configured to maintain the separate phases of oil and water, and can be used in adjusting and controlling the flow rate at the inlet to the split-flow pipe separator 108, and thus the flow of production fluids 102 into the control volume 116. Downstream of the control volume 116 the production fluids 102 are substantially separated into an oil component 118 and a water component 120. The separated oil and water components 118, 120 can be configured to enter subsequent processing equipment (not pictured) located downstream of the split flow separation system 100.

The block diagram of FIG. 1 is not intended to indicate that the multiphase separation system 100 is to include all of the components shown in FIG. 1. Further, any number of additional components may be included within the multiphase separation system 100, depending on the details of the specific implementation. For example, the multiphase separation system 100 can be designed to achieve liquid/gas as well as liquid/liquid separation, with or without pre-treatment, thus delivering substantially pure oil, water, and gas streams to the downstream equipment. Further, additional multiphase and single phase desanders may be placed upstream and/or downstream of the separation system 100.

Figure 2:
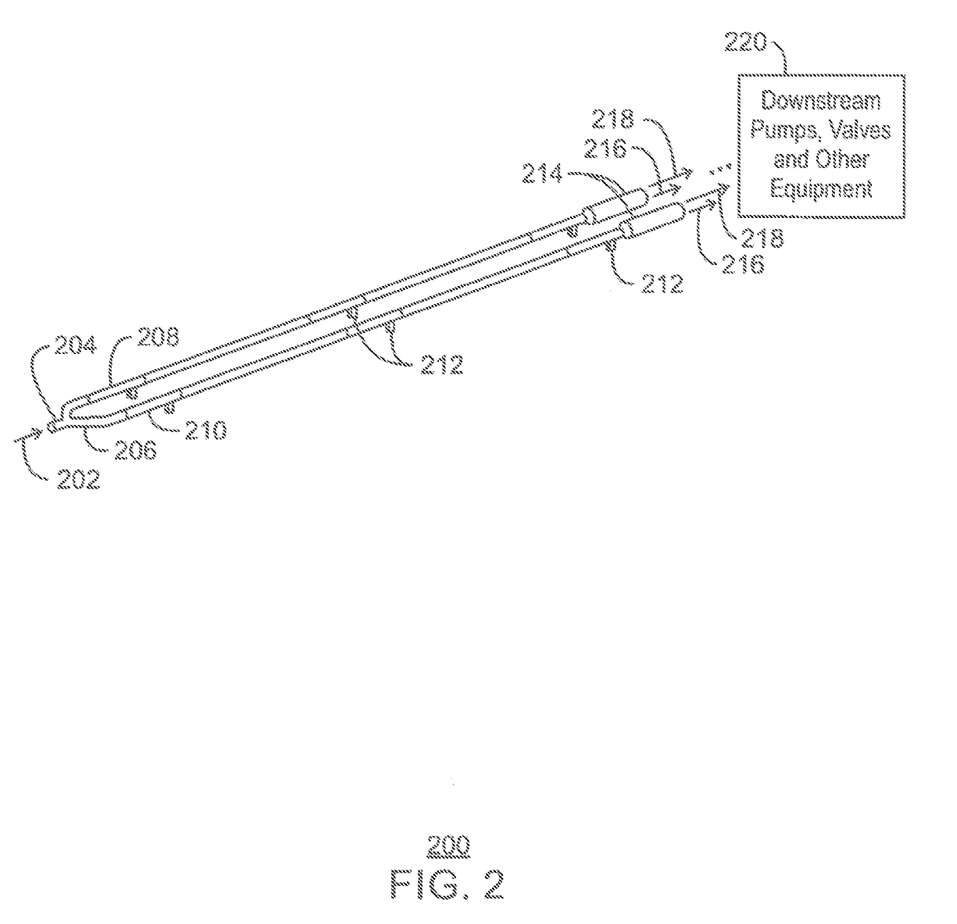
FIG. 2 shows an elevation drawing of a multiphase separation system 100.

FIG. 2 shows an elevation drawing of a multiphase separation system 200. A multiphase fluid 202 flows into the multiphase separation system 200 at a distribution inlet 204. The multiphase separation system 200 is split horizontally at a first divider 206 after the distribution inlet 204 into separate pipe separator lines 208 and 210. The Y-shaped split at the first divider 206 is configured to flow a multiphase fluid into at least two separate lines configured to separate the oil and water phases. The design of the multiphase separation system 200, including sand boots 212 to remove accumulated sand, avoids limitations of fluid capacity due to constrained vessel diameter and sand deposition, thus allowing for economical production and flow to occur. The multiphase separation system 200 allows for increased or at least continued flow at the capacity permitted by the design constraints of the system, which can be, for example, a subsea production well and system.

In modern deep-water subsea separation designs, an oil/water separator or pipe separator often have a diameter of less than about 30 inches due to pressure constraints. When performing separations under such a constrained cross-sectional area, the capacity of the system is limited since the fluid velocity cannot typically exceed about 0.3 m/s if sufficient separation is desired to allow for water injection. This velocity is variable depending on the properties of the fluids. The design length of the multiphase separation system 200, specifically the length of the pipe separator lines 208 and 210, can be chosen based on likely fluid properties and minimum residence times necessary for sufficient phase separation. If separation of a heavy oil that may emulsify is desirable, or if solids production such as sand is present, then long retention times may be required to achieve acceptable separation. However, due to size and weight constraints, this is not practical for many offshore and subsea applications. Designing a deepwater system for retention times greater than about three to five minutes becomes challenging.

If the diameter of a separation vessel for deepwater separation needs to be reduced to withstand higher pressures, the length is subsequently extended to enable for longer retention times. If sand is present in the system, then it will deposit along the length of the pipe during fluid separation. The deposited sand will consume cross-sectional area of the pipe and reduce available volume of the separator, thereby reducing retention time and separation capacity. For this reason, the sand can be periodically removed from the multiphase separation system 200. Accordingly, sand boots 212 may be placed along the pipe separator lines 208 and 210 to remove sand from the multiphase separation system 200 before the production fluids enter a control volume 214 at the end of each line.

A control volume 214 at the end of each pipe separator line 208 or 210 is configured to further separate and maintain separation between oil and water phases of the production fluids. The control volume 214 is a cylindrical structure larger in diameter than the pipe separator lines 208 and 210. The control volume can be configured to flow a partially separated multiphase fluid out a single outlet, or can be configured to flow substantially oil through an oil outlet, and substantially water through a water outlet. In the multiphase separation system 200 of FIG. 2, the control volume 214 is configured to flow mostly water through a water outlet 216, and mostly oil through an oil outlet 218. The control volumes 214 can be used to control and adjust the flow rate of fluids at the distribution inlet 204, divide 206, within the separator lines 208, 210, and at the outlets 216 and 218. Thus, while the pipe separator lines 208 and 210 are separate, the separation behavior in each is linked to the other via the upstream connection, and the shared downstream equipment 220, such as pumps, valves, and other equipment that can detect or control fluid interface levels, e.g., the phase interface level between relatively immiscible water and oil components.

The downstream equipment 220 can be configured to send a signal to a controller (not shown), which can adjust control valves that are connected to the oil and water outlets 216 and 218 and the pipe separator lines 208 and 210. The control valves are configured, at least in part, to effectively control the flow rate of each line into the control volume 214 such that the most efficient separation between the component phases of the multiphase fluid is achieved.

The schematic of FIG. 2 is not intended to indicate that the multiphase separation system 200 is to include all of the components shown in FIG. 2. Further, any number of additional components may be included within the multiphase separation system 200, depending on the details of the specific implementation.

Figure 3:
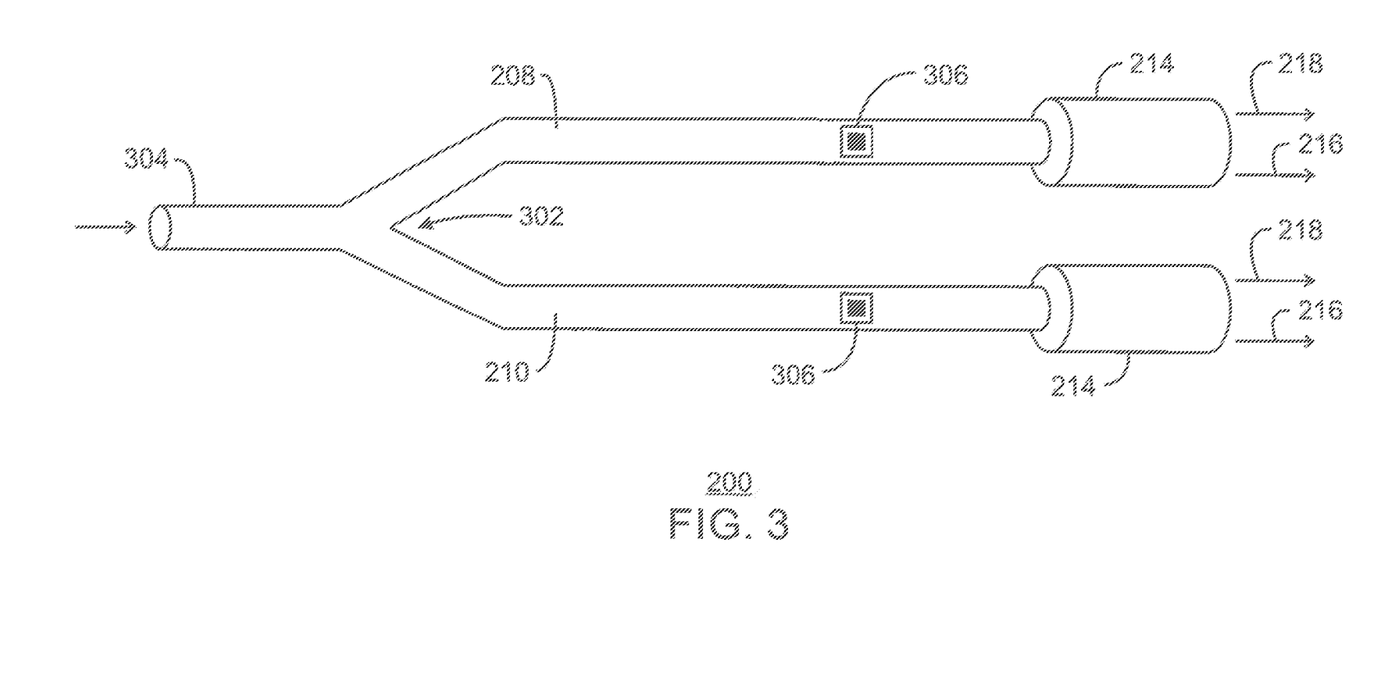
FIG. 3 is a top perspective view of the multiphase separation system 200.

FIG. 3 is a top perspective view of the multiphase separation system 200 of FIG. 2, illustrating a horizontal divide 302 that occurs in the multiphase separation system 200 after a distribution inlet 304. Like numbered items are as discussed with respect to FIG. 2. The multiphase separation system 200 includes a distribution inlet divide 302 configured to feed a multiphase fluid into the pipe separator lines 208 and 210. The multiphase fluid may be any type of fluid that includes relatively immiscible phases of matter, for example a fluid mixture of a water phase component, an oil phase component, and a solid sand particulate component. In an exemplary embodiment, the multiphase fluid includes production fluids from a subsea well.

The distribution inlet 304 can be coupled to a first pipe separator line 208 and a second pipe separator line 210 that are split horizontally at divide 302. The first pipe separator line 208 and the second pipe separator line 210 are located in a plane parallel to the distribution inlet 304. The flow in each of the pipe separator lines 208 or 210 can be influenced by baffle structures (not shown) installed within the lines.

In an exemplary embodiment, each of the pipe separator lines 208 or 210 may be horizontally oriented and configured to feed an independent control volume 214, where each control volume 214 is cylindrical in shape and has a diameter that is greater than the diameter of the pipe separator lines 208 and 210 connected to it. The multiphase separation system 200, splits the fluid flow into parallel main horizontal pipe sections for the separation of oil, water, sand and, in optional embodiments, an emulsion. Gasses may be removed in this or a previous section connected to the multiphase separation system 200, depending on the application. The divide 302 that creates the split in flow lines can result in higher purity oil and water streams at the outlets 216 and 218 of the multiphase separation system 200, compared to a conventional horizontal pipe separator. More specifically, the split flow allows for more fluid to be processed within the multiphase separation system 200, while maintaining capacity. The long residence times of fluids inside the pipe separator lines 208 and 210 becomes less of an issue for economical and efficient production when the flow is divided and capacity is maintained, even while operating at the flow rate required for optimal separation within the pipe separator lines 208 and 210.

The control volume 214 is configured to flow substantially water through the water outlet 216, and is configured to flow substantially oil through the oil outlet 218. In an alternative embodiment, flow lines downstream of the control volume 214 can be divided vertically (not shown) to achieve greater separation of the oil phase and the water phase, to slow respective flow rates, and for commingling in downstream processing equipment, such as a vertically oriented control volume (not shown), among others. In an exemplary embodiment, an electrostatic coalescer device 306 can be included in the multiphase separation system 200. To enhance the separation of oil and water the fluid from each pipe separator lines 208 or 210 is flowed through a polishing section. Further, the pipe separator lines 208 and 210 can be equipped with an electrostatic coalescer 306 for increased coalescence and separation of oil and water. In alternative embodiments, the flow lines of the multiphase separation system 200 can be equipped with coalescing and flow distribution internals, e.g., vane packs, perforated baffles, etc., that enhance separation of oil and water.

The schematic of FIG. 3 is not intended to indicate that the multiphase separation system 200 is to include all of the components shown in FIG. 3. Further, any number of additional components may be included within the multiphase separation system 200, depending on the details of the specific implementation. For example, the length of the pipe separator lines 208 and 210, and control volumes 214 can be altered, the length/diameter (L/D) ratio may be increased, upstream of or within the polishing section, to increase residence time and assist in oil/water separation. This may allow for the enhancement or the elimination of conventional downstream separation steps and processing equipment.

Figure 4:
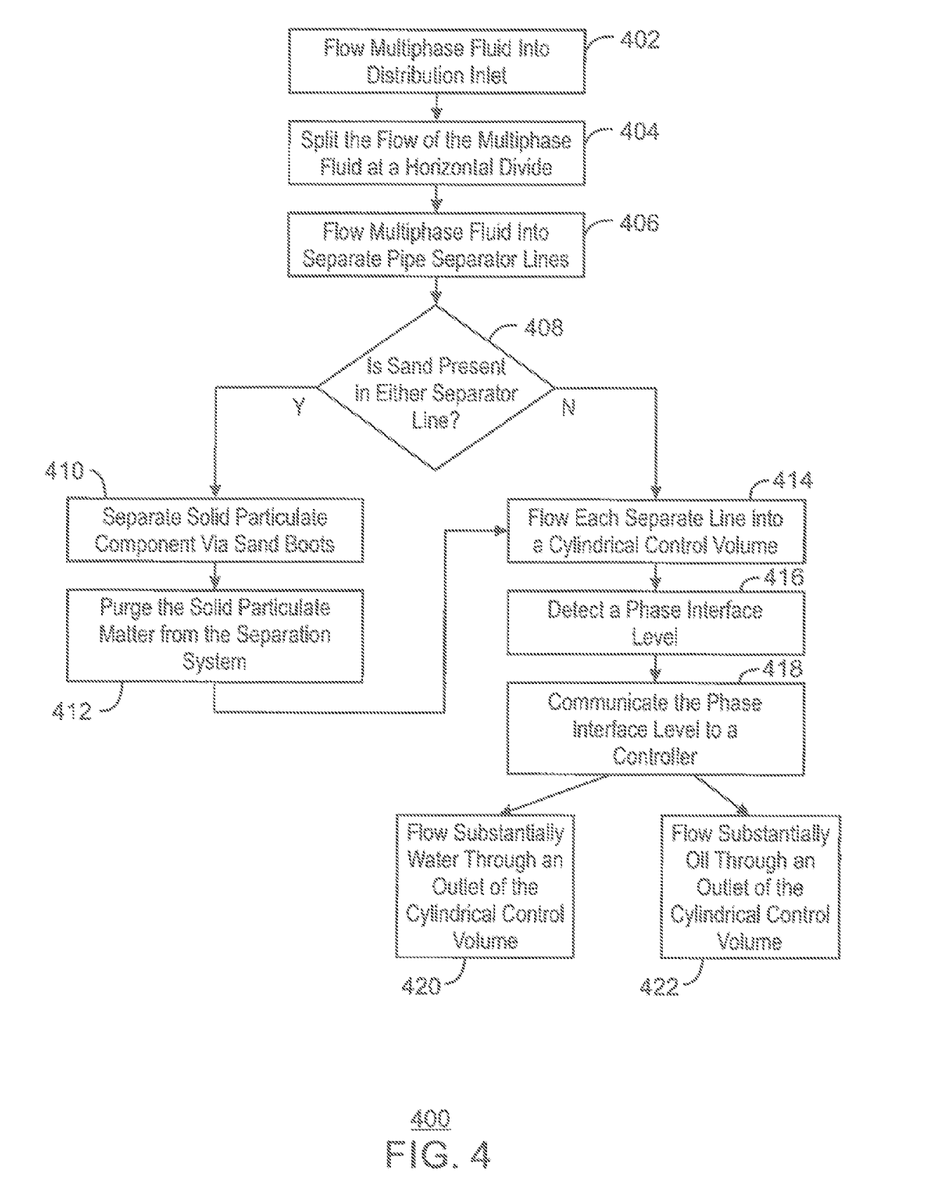
FIG. 4 is a process flow diagram illustrating a method 400 for separating phases of a multiphase fluid.

FIG. 4 is a process flow diagram illustrating a method 400 for separating phases of a multiphase fluid. In various embodiments, the multiphase separation system 200, discussed above with respect to FIGS. 2 and 3 is used to implement the method 400. In some embodiments, a gas-liquid separation process can be used upstream of the current method to remove gases from the production fluid. In these embodiments, the multiphase fluid is flowed into the distribution inlet of a gas-liquid separation system. The multiphase fluid is separated into gases and liquids within the gas-liquid separation system. The gas stream can be flowed into a gas outlet to be substantially separated from the liquid stream. The liquid stream moves on in the main process described herein.

The method 400 begins at block 402, at which the multiphase fluid is flowed into a distribution inlet of a multiphase separation system. At block 404, the multiphase fluid is split after the distribution inlet by a horizontally oriented divide. At block 406, each of the streams split from the distribution inlet is flowed into separate pipe separator lines in a plane that is substantially parallel to the horizontally oriented divide. Separation between components of the multiphase fluid is achievable while the multiphase fluid is flowing at or near capacity, in part because the flow has been split into different pipe separators. The multiphase fluid is separated, at least in part, into an oil phase and a water phase in the pipe separator lines. Each separate pipe separator line can flow for a set length of the separation system. This length can be configured to allow for a particular residence time for the fluid in each line. The residence time can be selected to promote an effective separation of the multiphase fluid in the separation system.

In exemplary embodiments, the multiphase fluid includes production fluids from a production well, such as a deep-sea production well with production oil and gases, and significant quantities of water and sand. At block 408, a decision is made as to whether sand is present and accumulating in either separator line. If sand is present, then the process moves to block 410 where the solid particulate component is removed via sand boots for the particular separator line. At block 410, any solid particles that might be present in the multiphase fluid, such as sand flowing in a production fluid, are separated using a downcomer and a sand boot. At block 412, the sand boot is periodically purged to remove the sand when a particular amount of sand has accumulated. For example, the sand that has accumulated beyond a set level can be fluidized by sand removal cyclones, which are triggered by the accumulated sand.

After the solid particulate matter is purged at block 412, or if an insignificant amount of solid particulate matter is present in either pipe separator line at block 408, the method 400 then continues at block 414. At block 414, each pipe separator line is flowed into a control volume, and the flow rate of each line is controlled in part within the control volume. At block 416, the phase interface level in each line of the separation system is detected. The oil and water levels that are detected by the level detector can be communicated to a control system. At block 418, a communication is made to a controller indicating the phase interface level that has been detected. The controller is configured to energize an electrically actuated control valve, which ensures the flow in each line is maintained at a specific rate. An exemplary control system will be discussed in more detail with respect to FIG. 6. At block 420, substantially water is flowed through a water outlet of the cylindrical control volume. At block 422, substantially oil is flowed through an oil outlet of the cylindrical control volume. The method 400 allows for the effective and economic separation of the multiphase components of particularly production fluids originating from a subsea well, and transported by subsea pipeline.

The process flow diagram of FIG. 4 is not intended to indicate that the steps of the method 400 are to be executed in any particular order, or that all of the steps of the method 400 are to be included in every case. Further, any number of additional steps not shown in FIG. 4 may be included within the method 400, depending on the details of the specific implementation.

Figure 5:
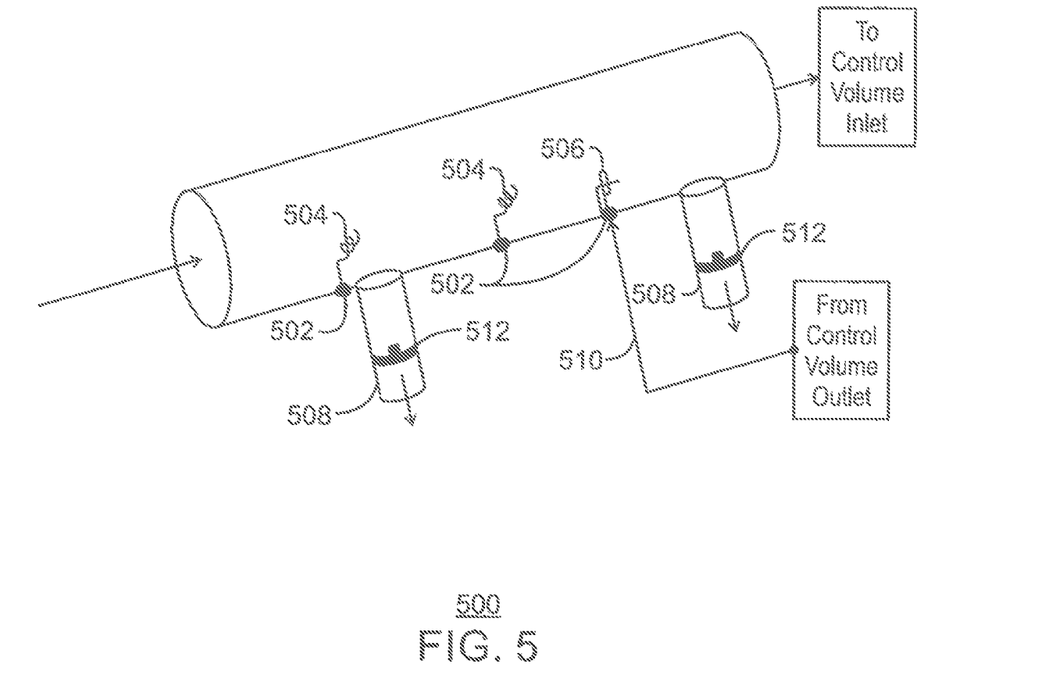
FIG. 5 is a side view of a schematic illustrating a separation system 500 with injection points 502 for sand removal cyclones 504.

FIG. 5 is a side view of a schematic illustrating a separation system 500 with injection points 502 for sand removal cyclones 504. Injection points 502 for jet nozzles 506 and sand removal cyclones 504 can be installed in a line, for example, of the multiphase separation system 200 of FIG. 2. Recycled water from the control volume outlet can be jetted at accumulated sand at the sand boots, to flush the sand through downcomers 508 located downstream of a jet nozzle 506. The injection points 502 can be used in conjunction with a recycle stream 510, such as a "clean" water recycle stream flowing from one of the control volumes. Multiple jet nozzles 506 for introducing recycled fluid flow, or additional sand removal cyclones 504 can also be used to influence the flow of a particular line of the separation system 500. A recycle stream 510 can be configured to flow from the control volume outlets or from upstream of the control volume from each separated component of a multiphase fluid within the separation system 500.

Additional downcomers 508 can be connected as sand traps to separate sand that accumulates in the separation system 500. The downcomers 508 can be sealed by a sand boot 512, which is a cylindrical volume oriented perpendicular to the horizontal pipe separator for the collection and drainage of sand accumulating in the line. The sand boot 512 can be configured to allow a preset amount of sand to accumulate before the sand boot is opened and sand is separated from the bulk water flow. Upstream of the sand boot 512, a jet nozzle 506 that is fed by a recycle stream 510 at an injection point 502. The recycle stream 510 through the jet nozzle 506 may act to flush the accumulated sand into a downcomer 508 in a similar respect to the sand removal cyclones 504. In some embodiments, multiple sand traps can be bundled and/or separately utilized to separate the sand from the multiphase fluid.

The sand boots 512 act to collect "travelling" sand dunes which continuously progress down the length of the pipe separator towards the control volumes. These dunes disrupt proper separation and consume separation volume needed for longer retention time. The sand boots 512 are short vertical sections of pipe connected to the bottom of the pipe separator. Over time, the sand boots 512 may fill with sand. At a certain set level, the sand removal cyclones 504, which are positioned at the bottom of the sand boots 512, can be activated. The sand removal cyclones 504 will fluidize the sand volume and will remove the sand from the boots 512 via a bottom connection. In this manner, the sand can be removed from the separation system 500 without shutdown or slowdown of production.

The schematic of FIG. 5 is not intended to indicate that the separation system 500 is to include all of the components shown in FIG. 5. Further, any number of additional components may be included within the separation system 500, depending on the details of the specific implementation.

Figure 6:
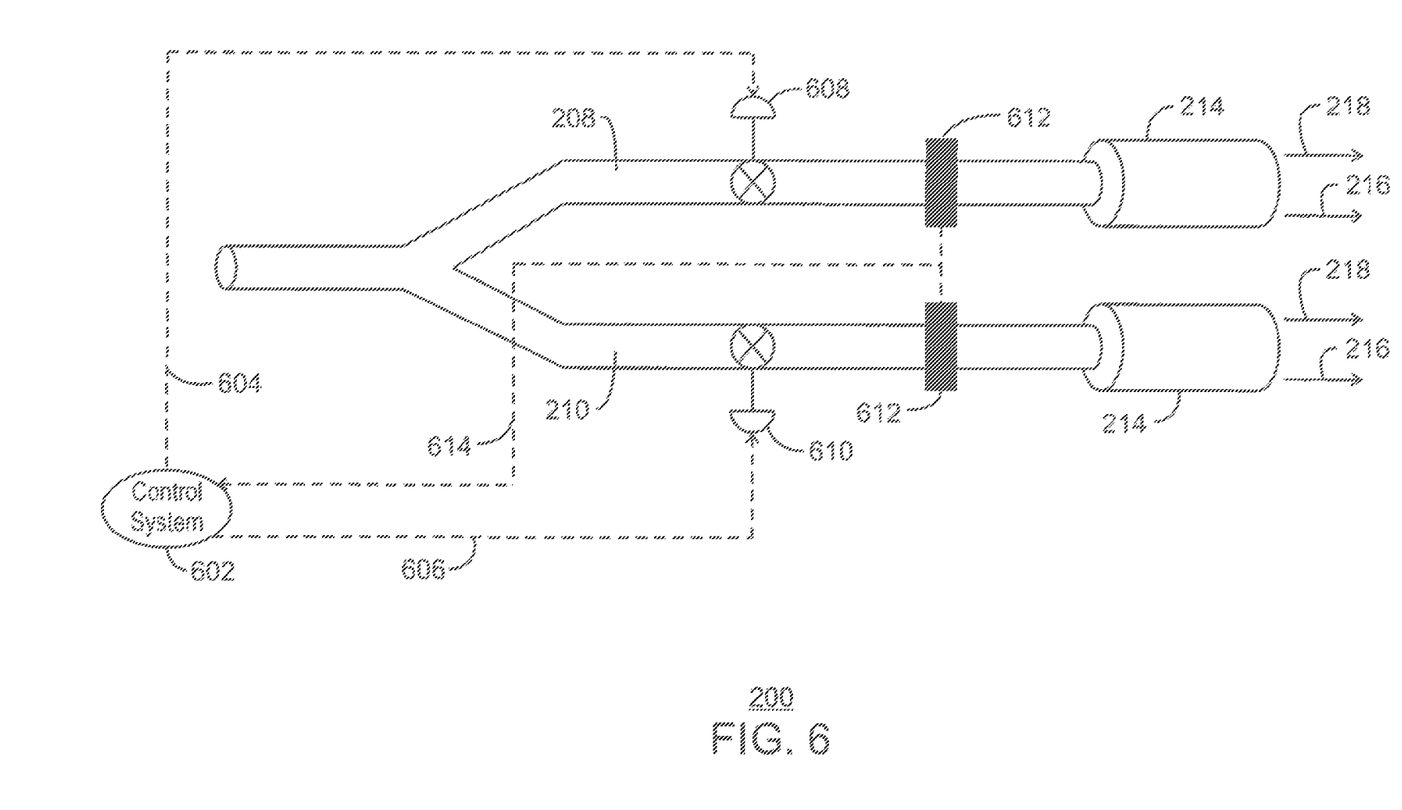
FIG. 6 is a schematic and block diagram illustrating a control system incorporated into the multiphase separation system of FIG. 2.

FIG. 6 is a top view of a schematic diagram illustrating a control system 602 incorporated into the multiphase separation system 200 of FIG. 2. Like numbered items are as discussed with respect to FIG. 2. The control system 602 is operative to flow fluid from each inlet of the separation system at a preferred rate based on certain measurements. The multiphase separation system 200 can use the control system 602 to send control signals 604 and 606 to control valves 608 and 610 that can be configured to control the mass flow through the multiphase separation system 200. The control system 602 may be part of a larger system, such as a distributed control system (DCS), a programmable logic controller (PLC), a direct digital controller (DDC), or any other appropriate control system. Further, the control system 602 may automatically adjust parameters, or may provide information about the separation system to an operator who manually inputs adjustments.

The control system 602 sends a signal 604 to control valve 608 to control the flow within a pipe separator line 208. Similarly, a control signal 606 sent to control valve 610 is used to control the flow within a separate pipe separator line 210. A measurement device 612 is configured to send a sensor signal 614 to the control system 602. For example, the sensor signal 614 may allow the control system 602 to send signals 604 and 606 to control valves 608 and 610 in response to an indication from a measurement device 612. In an exemplary embodiment, the measurement device 612 includes a level detector configured to measure the phase interface level between the oil and water within a production fluid flowing in the system 200. The control valves 608 and 610 remain subject to the signals from the control system 602 in communication with the level detector. As various levels of oil and water are detected in each line, the controller will receive signals corresponding to those levels and the control valves will be adjusted accordingly to facilitate multiphase separation in the pipes 208, 210.

The control valves 608 and 610 may be configured to regulate the fluid velocity in the separation system 200. The control system 602 is configured to control the flow of each pipe separator line 208 and 210 into a control volume 214. The length of each line may be configured to achieve a balance between substantial separation of the phases and the residence time of the fluids within the multiphase separation system 200. A measurement is detected by a measurement device (not shown) in the cylindrical control volume 214, and the flow of each pipe separator line 208 and 210 into the corresponding control volume 214 is controlled by communicating the measurement via the control system 602 to the control valves 608 and 610. The extent to which the control valves 608, 610 are open or closed will directly affect the flow rate of the multiphase fluid into the control volume 214. In an exemplary embodiment, separation between the water and oil phases is maintained within the control volume 214. A level detector within the control volume detects the level of the phase interface between the oil and water present at various sections of the vertical column. The residence times of each phase in the control volume may vary depending on the oil and water interface level that is detected. Ultimately, the control volume 214 is configured to flow substantially water from a water outlet 216 at the bottom of the column, and substantially oil from an oil outlet 218 at the top of the column. The outlets 216, 218 can connect to other downstream polishing separation stages, e.g., produced water hydrocyclones, or to a liquid injection, or to a liquid export pipeline.

The control system 602 can also detect an amount of sand that has accumulated over a sand boot (not shown). When this amount of sand reaches a certain level, the control system 602 can trigger activation of injection nozzles (not shown) and/or sand removal cyclones (not shown) to purge sand from the system 200. In this way, the amount of sand that reaches the cylindrical control volume 214 is negligible. This will minimize the amount of sand that will may be flowed through pumping units (not shown), and will also minimize the amount of sand injected into the production well, thus better maintaining the integrity of the production well.

It will be understood that separation system 200 shown in FIG. 6 has been simplified to assist in explaining various embodiments of the present techniques. Accordingly, in embodiments of the present techniques numerous devices not shown or specifically mentioned can further be implemented. Such devices can include flow meters, such as orifice flow meters, mass flow meters, ultrasonic flow meters, venturi flow meters, and the like. Further, compressors, tanks, heat exchangers, and sensors can optionally be utilized in embodiments in addition to the units shown.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A subsea multiphase separation system, comprising:
an inlet line;
a divide, wherein the divide horizontally splits the inlet line into two or more separate lines of similar diameter, and wherein the two or more separate lines of similar diameter are substantially parallel to one another, and are configured to separate components of a multiphase fluid;
a control volume connected to the two or more separate lines of similar diameter, wherein the control volume has a diameter greater than the separate lines of similar diameter, wherein the control volume comprises outlet lines, and wherein the outlet lines are configured to flow substantially oil from an upper outlet line and flow substantially water from a lower outlet line; and
a sand boot connected to one of the separate lines of similar diameter, wherein the sand boot is disposed below the one of the separate lines of similar diameter, and wherein the sand boot is configured to collect and remove sand accumulated in the subsea multiphase separation system; and a jet nozzle, disposed within one of the separate lines of similar diameter and connected to the lower outlet line of the control volume, the jet nozzle being positioned at an injection point upstream of the sand boot such that fluid from the lower outlet line is injected into the sand boot to activate a sand removal cyclone which fluidizes sand in the sand boot, the sand removal cyclone causing the sand to be removed from the sand boot without shutdown or slowdown of production of the subsea multiphase separation system.

2. The subsea multiphase separation system of claim 1, further comprising a control valve downstream of the control volume for controlling a flow rate at one of the outlet line at the control volume.

3. The subsea multiphase separation system of claim 1, wherein the subsea multiphase separation system is configured to operate in a subsea environment at water depths greater than 1500 meters, and wherein the multiphase fluid comprises production fluid from a subsea well.

4. The subsea multiphase separation system of claim 1, wherein the separate lines of similar diameter are coupled to an electrostatic coalescer.

5. The subsea multiphase separation system of claim 1, wherein the separate lines of similar diameter are further configured for a chemical additive to be injected.

6. The subsea multiphase separation system of claim 5, wherein the chemical additive comprises defoamers or demulsifiers.

7. The subsea multiphase separation system of claim 1, further comprising a downcomer coupled to one of the lines of similar diameter.

8. The subsea multiphase separation system of claim 7, wherein the downcomer is sealed by the sand boot, and wherein the sand boot is configured to open when an amount of sand has accumulated.

9. The subsea multiphase separation system of claim 1, wherein a pre-separator is utilized upstream of the multiphase separation system, and wherein the pre-separator is configured to separate a gas from the multiphase fluid.

10. The subsea multiphase separation system of claim 1, wherein an outlet from the control volume is configured to be recycled upstream.

11. The subsea multiphase separation system of claim 1, further comprising a polishing section.

12. The subsea multiphase separation system of claim 2, wherein the control valve is actuated based on signals communicated by a control system.

13. A method for the separation of oil, water, and solid particles within a multiphase fluid, comprising:
flowing a multiphase fluid into a distribution inlet of a multiphase pipe separator, wherein the distribution inlet is configured to split the multiphase fluid;
flowing the multiphase fluid into separate pipe separator lines downstream of a divide;
separating the multiphase fluid into an oil phase and a water phase in the pipe separator lines;
separating the solid particles using a downcomer and a boot, wherein the boot opens when the solid particles are accumulated;
flowing each pipe separator line into a control volume, wherein the flow rate from each pipe separator line is controlled;
flowing substantially water through an outlet at a lower end of the control volume, and flowing substantially oil through an outlet at an upper end of the control volume;
injecting water from the outlet at the lower and end of the control volume into the boot;
using the injected water, creating a sand removal cyclone within the boot, the sand removal cyclone fluidizing the accumulated solid particles; and
removing the fluidized solid particles from the boot without shutdown or slowdown of the steps of flowing the multiphase fluid and separating the multiphase fluid.

14. The method of claim 13, comprising lowering a velocity and pressure of the fluid in a pipe separator line through use of control valves.

15. The method of claim 13, further comprising detecting the oil and water phase interface level in each pipe separator line, and communicating with a controller to open and close control valves downstream of the control volume based on the oil and water phase interface level detected.

16. The method of claim 13, further comprising polishing the multiphase fluid in a polishing section upstream of the control volume.

17. A subsea multiphase separation system, comprising:
an inlet line configured to feed a multiphase fluid through a divide within the multiphase separation system, wherein the divide splits the multiphase fluid into multiple pipe separator lines that are substantially parallel, and wherein the multiple pipe separator lines are configured to allow sand to accumulate in an additional hollow space at the bottom of each of the multiple pipe separator lines;
a polishing section within the multiple pipe separator lines;
a control volume with a larger diameter than the pipe separator lines connected to each pipe separator line, wherein the control volume comprises multiple outlets;
a control valve configured to flow substantially oil at an outlet at the top of the control volume, and configured to flow substantially water at an outlet at the bottom of the control volume;
a jet nozzle, disposed within one of the multiple pipe separator lines and connected to the outlet at the bottom of the control volume, the jet nozzle being positioned at an injection point upstream of the additional hollow space such that fluid from the outlet at the bottom of the control volume is injected into the additional hollow space to activate a sand removal cyclone which fluidizes sand accumulated in the additional hollow space, the sand removal cyclone causing the fluidized sand to be removed from the additional hollow space without shutdown or slowdown of production of the subsea multiphase separation system;
a control system; and
a measurement device in communication with the control system, wherein the measurement device is adapted to measure an oil and water phase interface level at various points of the multiphase separation system, and wherein the control system is configured to adjust a flow rate in each of the pipe separator lines by adjusting the control valve based on the oil and water phase interface level measured.

* * * * *